US010632560B2

(12) United States Patent
Pedersen et al.

(10) Patent No.: US 10,632,560 B2
(45) Date of Patent: Apr. 28, 2020

(54) METHOD AND JOINING TOOL FOR JOINING TWO METAL ELEMENTS BY RIVETING AND WELDING

(75) Inventors: Roald Pedersen, Gjovik (NO); Morten Stein Eng, Kolbu (NO); Michael Wibbeke, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1268 days.

(21) Appl. No.: 13/876,965

(22) PCT Filed: Sep. 30, 2011

(86) PCT No.: PCT/EP2011/004899
§ 371 (c)(1),
(2), (4) Date: May 10, 2013

(87) PCT Pub. No.: WO2012/014515
PCT Pub. Date: Apr. 5, 2012

(65) Prior Publication Data
US 2013/0270229 A1    Oct. 17, 2013

(30) Foreign Application Priority Data
Sep. 30, 2010   (DE) .................. 10 2010 047 032

(51) Int. Cl.
*B23K 11/02* (2006.01)
*B21J 15/02* (2006.01)
(Continued)

(52) U.S. Cl.
CPC .............. *B23K 11/02* (2013.01); *B21J 15/02* (2013.01); *B21J 15/025* (2013.01);
(Continued)

(58) Field of Classification Search
CPC ... B23K 11/0026; B23K 11/02; B23K 11/115; B23K 11/166; B23K 11/20; B23K 11/36;
(Continued)

(56) References Cited

U.S. PATENT DOCUMENTS 3,534,456 A   10/1970   Swartz
3,672,553 A    6/1972   Doring
(Continued)

FOREIGN PATENT DOCUMENTS

DE             25 28 922         7/1976
DE    10 2004 025 492 A1         8/2009
(Continued)

OTHER PUBLICATIONS

Machine Translation of Koppe et. al. DE 102004025492 A1.*
International Search Report dated by the European Patent Office in International Application PCT/DE2011/001683.

*Primary Examiner* — Dana Ross
*Assistant Examiner* — James F Sims, III
(74) *Attorney, Agent, or Firm* — Henry M. Feiereisen LLC

(57) ABSTRACT

A method for connecting a first element with a second element, includes coupling a third element with the second element, coupling the third element with the first element by thermal joining, wherein the first element and the second element are made of different materials essentially incapable of being thermally joined with a welding process, and wherein the third element is arranged in an opening of the second element in a form fitting and/or force fitting manner.

11 Claims, 9 Drawing Sheets

(51) Int. Cl.
*B23K 11/36* (2006.01)
*B23K 11/16* (2006.01)
*F16B 5/04* (2006.01)
*F16B 5/08* (2006.01)
*B23K 11/20* (2006.01)
*B23K 11/11* (2006.01)
*B23K 11/00* (2006.01)
*B23K 101/00* (2006.01)
*B23K 101/18* (2006.01)
*B23K 103/20* (2006.01)

(52) U.S. Cl.
CPC ......... *B23K 11/0026* (2013.01); *B23K 11/115* (2013.01); *B23K 11/166* (2013.01); *B23K 11/20* (2013.01); *B23K 11/36* (2013.01); *F16B 5/04* (2013.01); *F16B 5/08* (2013.01); *B23K 2101/006* (2018.08); *B23K 2101/185* (2018.08); *B23K 2103/20* (2018.08); *Y10T 29/49943* (2015.01)

(58) Field of Classification Search
CPC ........ B23K 2201/006; B23K 2201/185; B23K 2203/20; B21J 15/02; B21J 15/025; F16B 5/04; F16B 5/08; Y10T 29/49943
USPC .................. 219/106, 94, 118, 150 V, 157
See application file for complete search history.

(56) References Cited

U.S. PATENT DOCUMENTS

| | | |
|---|---|---|
| 5,771,551 A | 6/1998 | Schurter et al. |
| 2005/0133483 A1 | 6/2005 | Hou et al. |
| 2007/0034662 A1* | 2/2007 | Opper ............... B21J 13/03 227/51 |
| 2007/0084038 A1* | 4/2007 | Cochet ............... B21J 15/02 29/524.1 |
| 2009/0065484 A1* | 3/2009 | Wang ............... B23K 11/115 219/118 |
| 2009/0212062 A1* | 8/2009 | Craythorn ........... B21J 15/32 221/1 |
| 2009/0294410 A1* | 12/2009 | Iwase ............... B21J 15/025 219/91.23 |
| 2011/0133493 A1* | 6/2011 | Perkins ............... E05B 85/26 292/216 |

FOREIGN PATENT DOCUMENTS

| | | | |
|---|---|---|---|
| EP | 0 428 496 A1 | 5/1991 | |
| EP | 0 967 044 A2 | 12/1999 | |
| EP | 0967044 A2 * | 12/1999 | ........... B23K 11/115 |
| EP | 2 127 797 | 12/2009 | |
| JP | 06126464 A * | 5/1994 | |

* cited by examiner

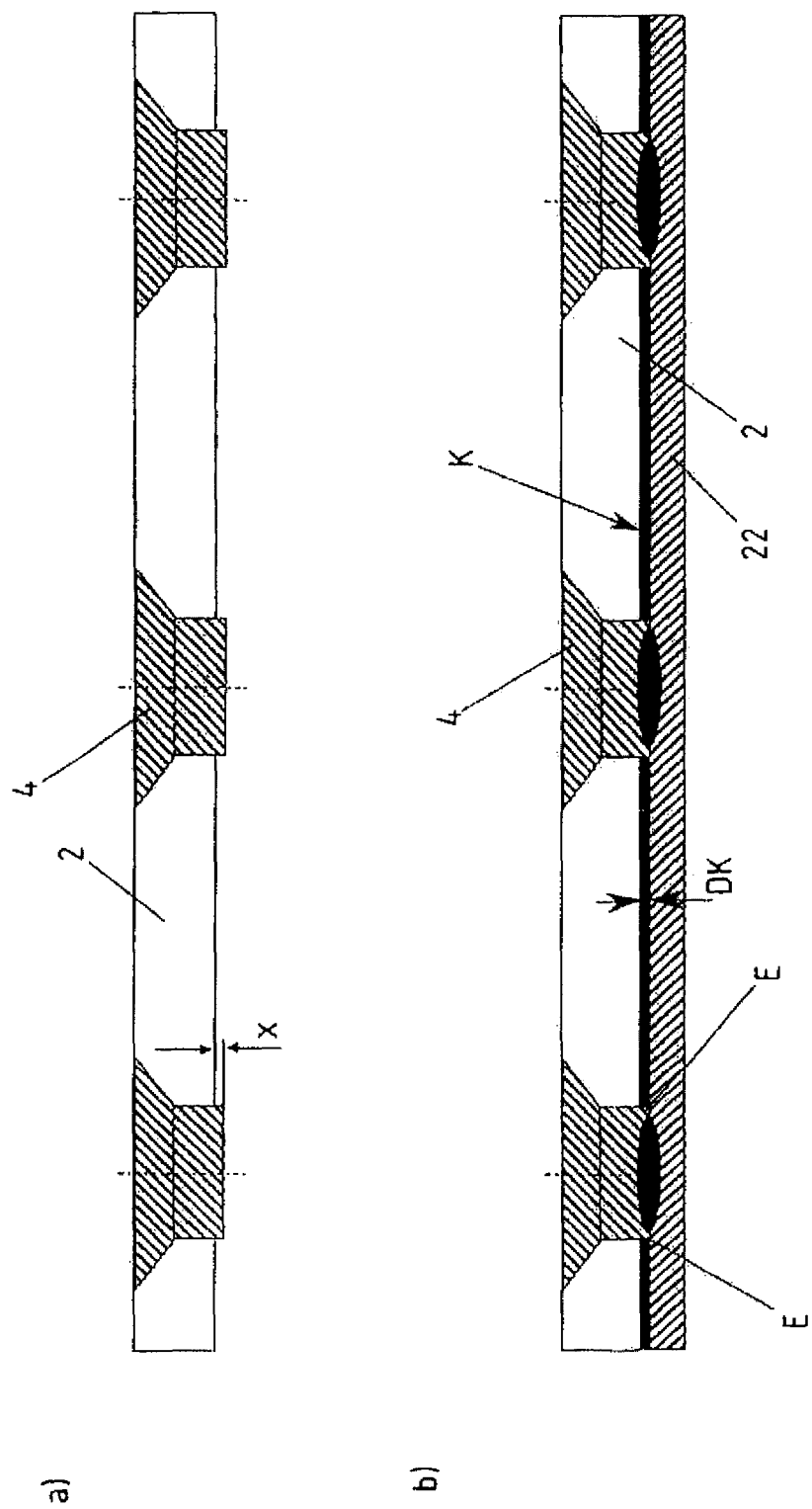

METHOD AND JOINING TOOL FOR JOINING TWO METAL ELEMENTS BY RIVETING AND WELDING

CROSS-REFERENCES TO RELATED APPLICATIONS

This application is the U.S. National Stage of International Application No. PCT/EP2011/004899, filed Sep. 30, 2011, which designated the United States and has been published as International Publication No. WO 2012/041515 A1 and which claims the priority of German Patent Application, Serial No. 10 2010 047 032.5, filed Sep. 30, 2010, pursuant to 35 U.S.C. 119(a)-(d).

BACKGROUND OF THE INVENTION

The present invention relates to a method for connecting a first element with a second element.

The present invention further relates to a device for generating a connection between a first element and a second element.

Two metallic materials, in particular when they are composed of different alloy elements are weldable only to a limited extent. For example, steel materials and lightweight steel materials are not joinable with conventional thermal joining methods, in particular welding methods.

From the state of the art, different approaches are known with which it is possible to produce hybrid components. For example, non-iron materials which are to be joined in a steel construction are initially coupled by screws or rivets which are then welded to the steel construction. Oftentimes, additional through-holes are required for performing the welding process.

Another known approach for producing a hybrid component is for example a welding-soldering process. In this case, the metallic elements of the welding-soldering process are provided with a coating and subsequently coupled with a lightweight metal component. The melt or respectively the solder forms a connection with the coating of the metal element.

The manufacturing methods for producing hybrid components are however, of only limited strength or are only producible with high effort. These manufacturing methods also strongly limit the design options for example due to attachment of a steel plate by screwing or the riveting.

SUMMARY OF THE INVENTION

An object of the present invention is therefore to provide a method with which it is possible to couple two different metallic materials in a cost saving and simple manner within a broad range of applications and to provide a device which enables performing the coupling method.

The previously mentioned object is solved with a method for connecting a first element with a second element, wherein the first element and the second element are made of different materials, that essentially cannot be thermally joinable with a welding process, in which a third element is coupled with a second element and the third element is coupled with the first element by thermal joining, characterized in that the third element is arranged in an opening of the second element in a form fitting/and/or force fitting manner.

The part of the object relating to the device is further solved with a device for producing a connection between a first element and a second element with the method according to the invention, wherein the device includes a ram for punching out and riveting and for introducing the third element; and a counter holder movable into at least two positions and having an exit opening and a counter holder surface.

Advantageous embodiments and refinements of the present invention are the subject matter of the dependent patent claims.

The method according to the invention enables joining a first element with a second element, wherein the first element and the second element are made of different materials which are essentially incapable of being thermally joined with a welding process. For this, a third element is coupled with the second element and subsequently, the third element is connected with the first element by thermal joining. Particularly preferably, the third element is arranged force fittingly and/or form fittingly in an opening of the second element. The third element can be pressed or clamped into the second element. Within the framework of the invention, it is also conceivable to bond the third element or to weld the third element in by way of a friction-welding connection. Particularly preferably, the third element is riveted into an opening of the second element. With the method according to the invention for coupling two components, it is possible to couple a large range of different combinations of materials. For example the following combinations of materials are joinable with the method according to the invention in a form fitting and/or materially bonded manner: Aluminum/ steel, lightweight metal/steel, steel/plastic, light weight metal/plastic, plastic/aluminum, steel/steel, (different types of alloys), aluminum and plastic/steel or plastic/lightweight connections. Within the framework of the invention, fiber composite materials can also be coupled with steel alloys or similar materials.

With the method according to the invention it is in particular possible to couple different materials in the vehicle body construction of motor vehicles or utility vehicles or buses reliably in a materially bonding and force fitting and/or form fitting manner. Further fields of application are for example aircraft construction, agricultural technology or the construction of see vessels such as for example boats, amphibious vessels or the like. With the method according to the invention it is also possible to couple transport containers or armor components. Fields of application in vehicle construction are for example vehicle body parts, such as columns, in particular A-column, B-column, C-column and/or D-column, cross member cross plates, hat rests, transmission tunnel, sills, longitudinal member, cross member, floor panels, outer skin of the roof, outer skin of the door, side walls, fenders, impact absorbers, bumpers or plastic outer skin parts of the vehicle body or aluminum or steel components of the vehicle body with underlying plastic. With the method according to the invention it is further possible to couple reinforcement structures, in particular patches of different materials, in particular for the vehicle body construction in the motor vehicle field, in a vehicle body.

In the method according to the invention for coupling two elements which are made of different material structures, a third element is arranged in an opening of the first element itself and is preferably riveted. The third element has a material composition which can be coupled with the material composition of the first element via a thermal joining process, preferably a welding process, in particular a resistance welding method or a laser welding. After the third element is arranged in the second element, it is coupled to the first element via a joining process so that a welding connection is generated between the first element and the third element. Due to the fact that the third element is force fittingly and/or form fittingly coupled to with the second element a coupling between the first element with the second element is also generated.

The form fitting and/or force fitting connection of the second element with the third element is increased by thermal expansion during the joining process and by plastic deformation after the joining process in the strength of the generated connection. For this, the third element is particularly preferably riveted pressed or clamped in the second element. For further increasing the strength of the generative connection, the third element can have a surface structuring. The surface structuring can for example be configured in the form of a profiling or a riffle. The form fitting and/or force fitting connection is reinforced by the surface structuring.

The profiling results in a larger surface to be coupled, which increases the possibilities of the form fitting and/or force fitting.

The method according to the invention further includes coating the third element. Particularly preferably, the coating is a weldable corrosion protection coating. For example, a zinc-aluminum-tin coating or a dip galvanizing. The third element can further be bonded in the second element. The bonded connection results in an optimal preparation for the subsequently performed welding connection between the third element and the first element. Further, the bonding connection increases the strength of the coupling point between the first element, second element and third element. The bonding connection can for example be produced by applying an adhesive layer between the first and the second element. By introducing the third element, the adhesive layer is also used for the fastening of the third element and then at least in regions of the third element are coupled with the first element by way of the welding.

Preferably, the material combinations aluminum/steel can be coupled with a third element made of steel, plastic/steel with a third element made of steel or plastic/aluminum with a third element made of aluminum. Plastics also relates to composite fiber plastics or fiber composite materials.

In a preferred embodiment, an opening in the second element is punched into the second element with a ram tool and subsequently the third element riveted in the opening of the second element with a rivet tool. Especially with regard to manufacturing, this offers the possibility to relatively quickly generate a process sequence in which an opening for example in a sheet metal section is generated and subsequently the third element is arranged in the opening and riveted. The cycle times of a manufacturing process can thus be decreased in a targeted manner.

In a particularly preferred embodiment, the opening is punched into the second element with the third element itself, wherein the third element has a punching collar on its side which faces toward the second element. In this case the third element is positioned on the untreated second element. The punching collar further enables compensating the differences in thickness of the second element and associated therewith force fittingly and/or form fittingly arranging the third element in the second element, preferably by riveting.

In a first process sequence, the third element is riveted into the second element with the ram tool. For this, the third element has a preferably circumferential punching collar, which is for example formed on the outer rim of the third element in a pointed extension on the side facing the second element. The third element is pressed into the second element with the punching collar first and subsequent to which hole is punched with approximately the exact dimensions of the third element to be introduced into the second element. As a result of the combined punching-out and introducing process, the third element is positioned and arranged directly in the second element so that in a subsequent riveting process step the element can be directly correctly positioned and coupled form fittingly with the second element. This again allows reducing the cycle time of the manufacturing method according to the invention. The punching collar of the third element also prevents a tool wear on a punching tool which in turn lowers the tool costs. The punching collar can also be configured as punch rivet collar.

In order to perform the process particularly reliably, the third element is held in position above the second element by a holding element before the punch step, wherein the third element is in particular embraced by the holding element. The holding element is for example configured in the form of a holding ring into which the ram tool can be inserted. The holding ring positions the third element relative to the hole to be punched and is particularly preferably traversed by the ram tool. The ram tool is thus guided by the holding element which in turn increases the accuracy of the entire process. The holding element can further be coupled with a refill device so that in an automated process the third element is automatically inserted into the holding element and brought into position by the ram tool. The holding element can also be configured as a type of magazine or a revolver configuration which in turn increases the manufacturing options and decreases the cycle time.

Particularly preferably, the punch tool and the rivet tool is used as a combination tool wherein the tool has a ram and a counter holder. In particular, when using a combination tool in the method according to the invention the retooling costs can be lowered so that it is possible to reequip existing manufacturing lines with a combination tool according to the invention or to equip new manufacturing lines with a combination tool to save costs. For the punch step and for the rivet step essentially the same sequence of movement in particular lift processes are required so that the combination represents an optimal use of the manufacturing synergies.

When using the combination tool, it is particularly advantageous when the counter holder is moved into a first position for the punching step and has an exit opening which enables the material of the second element in the counter holder to be punched out to exit the punched out piece. In a concrete embodiment this means that in the case of a round punching out a round exit opening is present in the counter holding tool in the first position, so that the punched out material of the second element can fall downward with a ram lift movement and an insertion of the third element with the punching and rivet collar. Preferably, the counter holder tool also has a collection reservoir so that the exiting material can be collected and subsequently recycled.

In a further particularly preferred possible embodiment of the exit opening, the latter is formed by an exchange tool so that a counter holder or a combination tool can be adjusted to different punching out openings by a simple adapter change. These punching out openings can for example be configured star shaped, square or elliptical or as a hybrid shape of the aforementioned embodiments wherein respective correspondingly configured third elements are used.

According to the invention, the counter holder is moved into a second position, wherein in the second position the third element which is inserted into the second element is riveted to the second element by means of the ram and the counter holder. As previously mentioned, the rivet tool and the punching tool undergo the same tool movement in form of a preferred lift movement. The punching out and rivet collar of the third can preferably impact the counter holder tool, whereby the third element has the function of a type of blind rivet or a pop rivet. The surface of the counter holder is essentially flat so that the third element impacts a counter holder surface and is riveted full (over the) surface. It is also conceivable within the framework of the invention to adjust the counter holder surface in the second position to a certain surface characteristic or to a geometric shape so that the riveting is particularly adjusted to the particular purpose.

In a further particularly preferred embodiment of the method according to the invention, the third element is riveted with the second element so that the wall thickness of the third element is identical to the wall thickness of the second element in a region that surrounds the punch out. This results in the advantage, especially with regard to manufacturing and technical options of the design to be produced, that the metallic sheet metals in the region of the riveting have similar strength values owing to an approximately identical wall thickness.

The coupling of the first element with the third element is then again performed by way of a resistance welding in particular a point welding process. This offers the particular advantage that no recesses have to be introduced into the third element in order to use a melting welding process or other conventional welding processes to couple the first element with the third element. The point welding process enables to form a third element which has a very small diameter wherein an element with a very small diameter means an element of a diameter of preferably less than 2.5 cm in particular less than 1.2 cm. This in turn results in the possibility that the second element only loses an insignificant amount of strength due to the punctual punching out relative to its overall structure.

The resistance welding offers in connection with the method according to the invention a particularly fast performance of the coupling by welding so that again the use of a resistance welding has a particularly beneficial effect on the costs of the overall manufacturing process especially when taking the possible short cycle times into account.

The method according to the invention is used in particular for a first element and a third element made of a steel alloy and a second element made of a lightweight alloy. With regard to the possible fields of application in the motor vehicle construction aircraft construction or other machine construction area these are the predominantly used materials. Especially in the context of current light construction concepts in the aforementioned theme areas the method according to the invention is particularly useful and offers the possibility to innovatively refine existing processes and to open up new possibilities for construction.

Particularly preferably, the method is used for producing motor vehicle parts. In this regard it is conceivable to couple vehicle body parts such as subfloor transmission tunnel fire protection walls or beams, side skirts with columns in form of A-columns, B-columns, C-columns, D-columns. It is further possible to couple aluminum vehicle bodies with steel components so that crash endangered areas are reinforced. Another advantage is to couple steel components of high or ultra high strength with the method according to the invention with aluminum components.

The object that underlies the invention is solved by a device according to claim 13. For producing a connection between a first element and a second element, a third element is introduced into the first element and the connection of the elements (components) attained by a joining between the first and the second element. For introducing a third element, a ram for punching out and riveting and a counter holder with an exit opening and a counter holder surface are provided wherein the counter holder can be moved into at least two positions. Especially with regard to cost considerations the movement of the counter holder into at least two positions offers a particularly cost saving application of the method introduced by the invention according to one of the claims 1 to 11.

Further, a holding element with a through opening is provided on the device according to the invention wherein the through opening can be traversed by the ram. The holding element itself can be configured as a magazine for multiple third elements to be introduced or for example as a revolver magazine. The device according to the invention thus offers the possibility to perform the method according to the invention in particular under cost effective manufacturing aspects, in a highly precise and continuous manner. The holding element further guides the ram tool, so that a high precision of the method according to the invention is ensured. The combination of the holding element with a refill magazine allows performing the process with constant precision continuously without interruptions. In the case of using a revolver magazine this offers the possibility to introduce third elements with different geometries into the second element without laborious change and justification processes.

In a further preferred embodiment of the device according to the invention, the ram and the counter holding tool can be used as electrodes for the resistance welding. This also reduces the cycle time and lowers the manufacturing costs. A ram that can be used as electrode also means that the ram is two-part wherein an outer division of the ram carries out the punching and riveting process and an inner component of the ram the welding process. The same applies to the counter holder. For example in the riveting surface or through the punched out opening a second electrode can be guided within the frame work of the invention.

BRIEF DESCRIPTION OF THE DRAWING

Further advantages, features, properties and aspects of the present invention become apparent from the following description. Advantageous embodiments are shown in the schematic figures. These serve for an easy understanding of the invention. It is shown in.

DETAILED DESCRIPTION OF PREFERRED EMBODIMENTS

In the figures, same reference signs are used for same or similar components, even when a repeated description is omitted for reasons of simplification.

Figure 1:
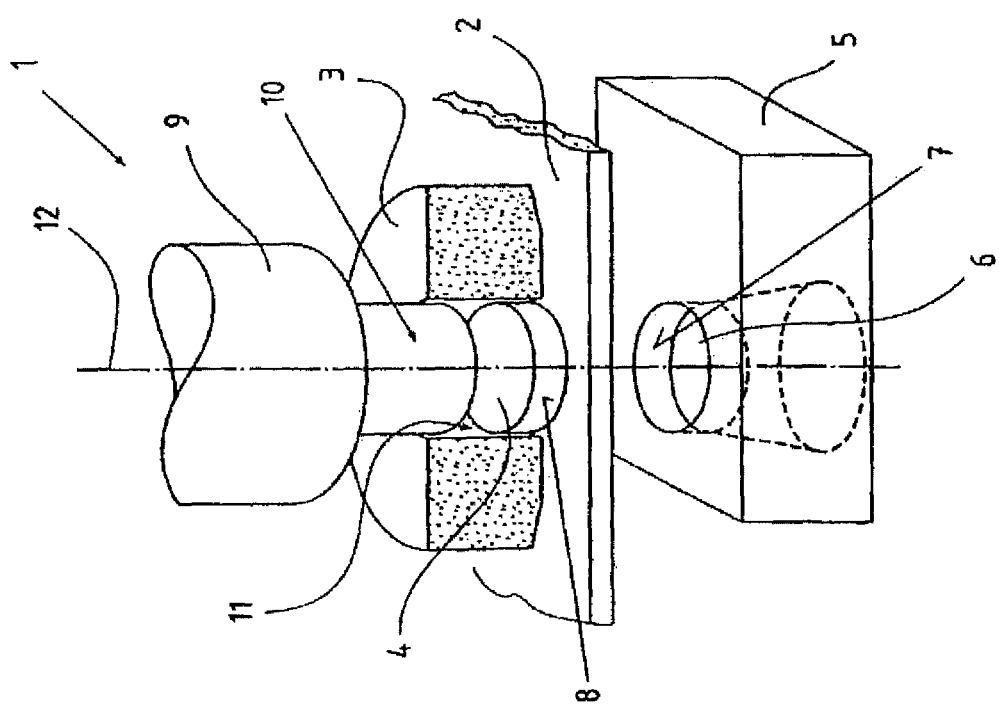
FIG. 1 a perspective sectional view of a first method according to the invention, FIG. 2 the same perspective sectional view, wherein the counter holder is shown to be movable into two positions, FIG. 3 a sectional view through a tool according to the invention during the punching out method step, FIG. 4 a sectional view through a tool according to the invention during the riveting process, FIG. 5 the method according to the invention during a point welding, FIG. 6 different embodiments of the third element, FIG. 7 a motor vehicle component produced with the method according to the invention, FIG. 8 a sectional view of the method steps according to the invention for inserting the third element, FIG. 9 embodiments of the third element with upper collar, FIG. 10 an adjustment possibility of the thickness tolerance of the second element with the third element, FIG. 11 a side impact protection in a door which side impact protection was produced with the method according to the invention, FIG. 12 a combination tool according to the invention with a thickness compensation element and FIG. 13 an embodiment with arranged adhesive layer.
Figure 5:
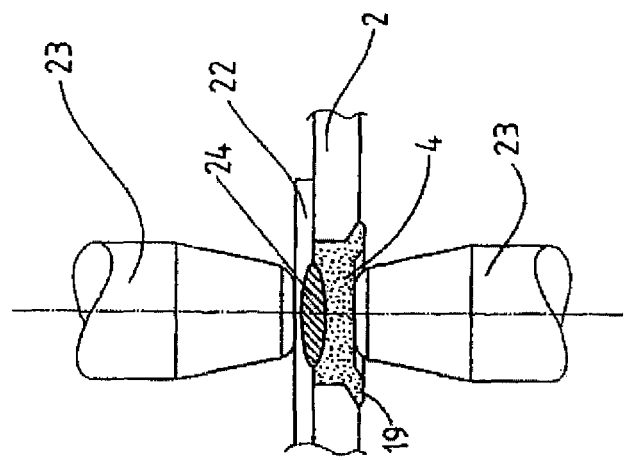

FIG. 1 shows a combination tool 1 according to the invention for performing the method according to the invention, wherein a first element 22 shown in FIG. 5 is coupled with a second element 2 via a third element 4. A second element 2, here shown in the form of a section of a sheet metal, is arranged between the combination tool 1. A third element 4 is arranged and positioned on the second element 2 via a holding element 3. Below the second element 2 a counter holder 5 is positioned. The counter holder 5 has an exit opening 6, wherein the exit opening 6 is minimally greater in its outer sheath surface 7 than the sheath surface 8 of the third element 4. Further, a ram 9 is arranged above the third element 4. The ram 9 has a projection 10 which is insertable into an opening 11 of the counter holder 5. A longitudinal axis 12 defines the arrangement of ram 9, counter holder 5, third element 4 and holding element 3 relative to one another.

Figure 2:
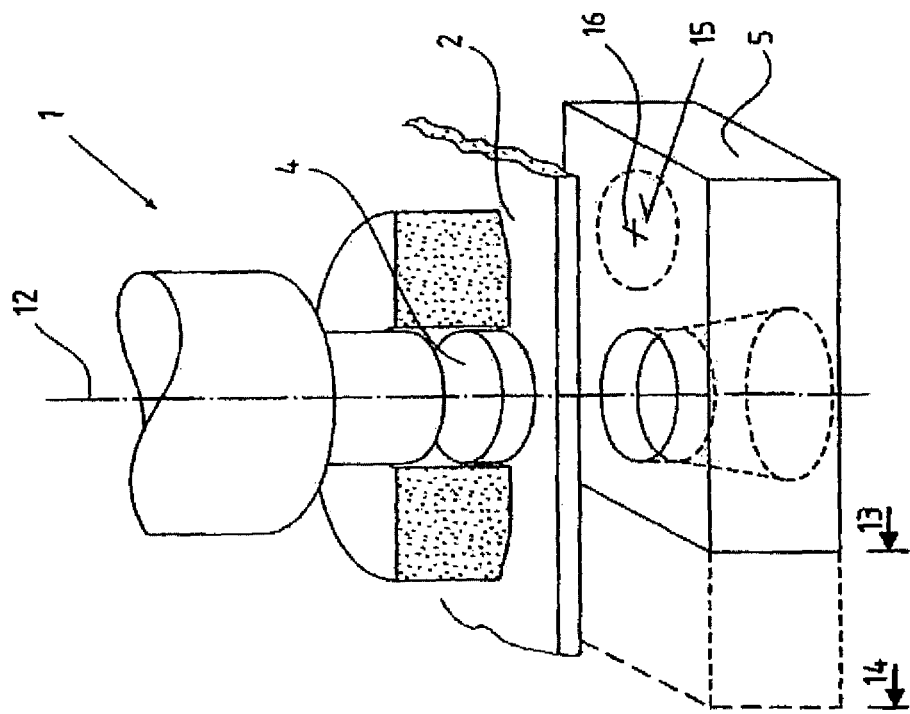

FIG. 2 shows the same combination tool 1 as shown in FIG. 1, wherein the counter holder 5 is moved into a first position 13 for performing the punching out process or the insertion process of the third element 4 into the second element 2. The counter holder 5 is then movable into a second position 14, wherein in the second position 14 the counter holder 5 can be used to perform the riveting process. For this, a rivet surface 15 is formed on the counter holder 5. The longitudinal axis 12 is configured in the first position 13 of the counter holder 5 so that the exit opening 5 centrically lies on the longitudinal axis 12, in the second position 14 the rivet surface 15 lies on the longitudinal axis 12 with its center 16.

Figure 3:
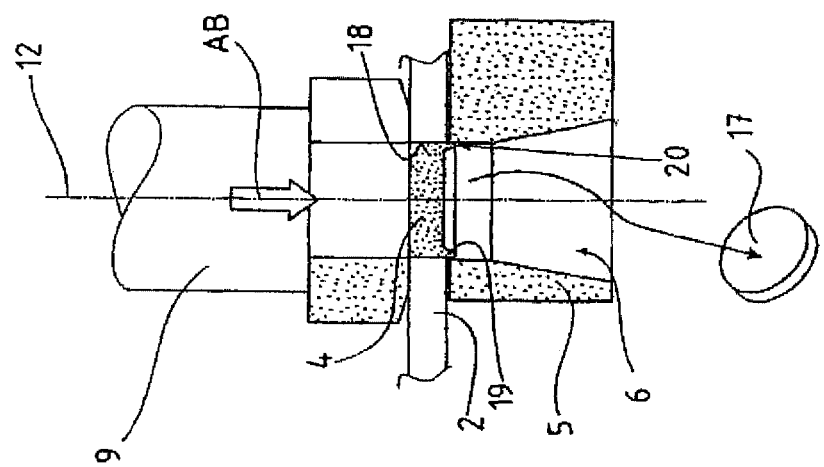

FIG. 3 shows a sectional view of the tool 1 according to the invention during the punching process. Here, the ram 9 performs an axial movement AB in the direction of the longitudinal axis 12. By means of the third element 4, a punched out piece 17 exits through the exit opening 6 out of the counter holder 5. At the same time the third element 4 is inserted into the punched out opening 18 of the second element 2 through by the ram 9. In order for the third element 4 to generate a precise punching out process in the second element 2, it has a punching collar 19. The punching and rivet collar 19 is configured so that a projection 20 which is shown in a cross section, is formed on the third element 4.

Figure 4:
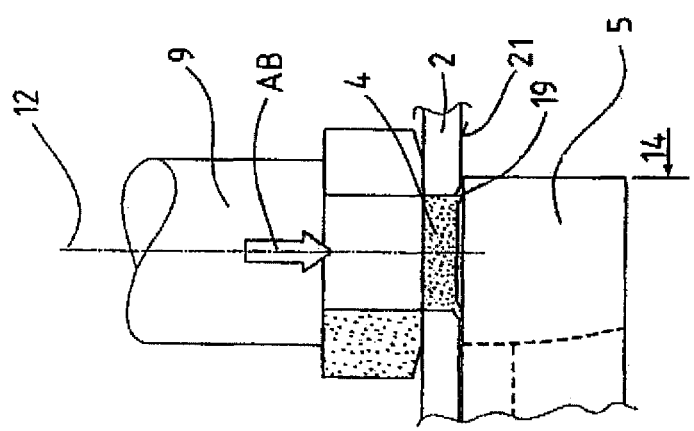

FIG. 4 shows a method step following the method step in FIG. 3, wherein the counter holder 5 is moved into the second position 14 for riveting. The ram 9 undergoes a second movement in axial direction AB relative to the longitudinal axis 12, so that the third element 4 is form fittingly riveted together with the second element 2. For this, the punching and rivet collar 19 is substantially bent in the direction toward the bottom side 21 of the second element 2 so that a form fitting fit is enabled.

FIG. 5 shows a further method step following the method step shown in FIG. 4, wherein the second element 2 is arranged relative to a first element 22 and then the first element 22 is materially coupled with the third element 4 which is form fittingly coupled in the second element 2. The coupling occurs, as shown in FIG. 5, by means of a resistance welding method via two-point welding electrodes 23. The point welding electrodes 23 create a material connection 24, shown in FIG. 5 between the first element 22 and the third element 4. It is further shown that the first element 22 is arranged on the side of the second element 2 which is opposite the punching and rivet collar 19. Thus an additional form fitting enclosure of the second element 2 between the first element 22 and the third element 4 occurs.

Figure 6:
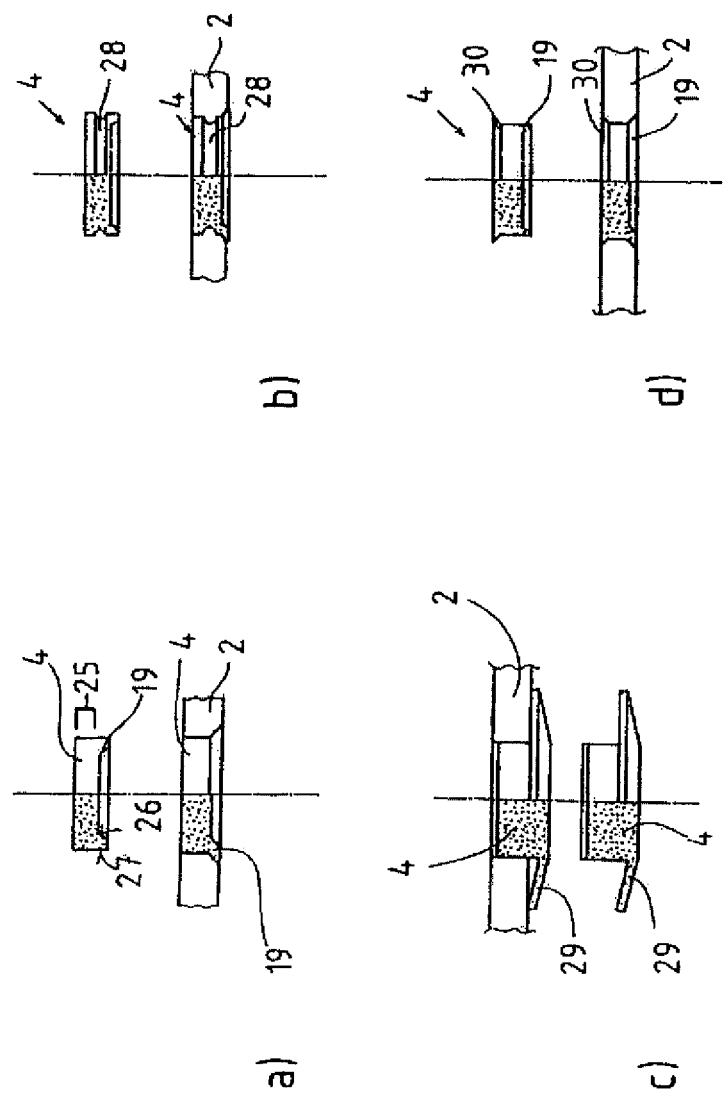

FIG. 6 shows four different embodiments under the positions a) to d) of the third element 4, wherein the third element 4 is respectively shown in its starting condition and then in a form fitting engagement with the second element 2.

FIG. 6 shows the third element 4 in its simplest application. Substantially, it is a cylinder shaped section 25, which additionally has a punching and rivet collar 19, which extends in the direction of the second element 2. The punching and rivet collar 19 itself has a slanted flank 26 and a straight flank 27. This allows using it as punching and cutting tool during the insertion process into the second element 2. The punching and rivet collar 19 is then as shown in FIG. 6a bent in the second element 2 so that the third element 4 is riveted to the second element 2.

FIG. 6b shows a further possible embodiment of the third element 4. In addition to FIG. 6a, the third element 4 in FIG. 6b has a circumferential groove 28. The circumferential groove 28 ensures a better from fit and with this a stronger fit of the third element 4, after it is riveted to the second element 2.

FIG. 6c shows a further embodiment of a third element 4 wherein the third element 4 has a flange 29 which enables a residual spring loaded fit of the second element 2. The third element 4 according to FIG. 6c is thus riveted in the second element 2 and according to the here not shown welding process an additional spring action supports the form fitting fit of the second element 2 between the here not further shown first element and the third element 4.

FIG. 6d shows a further embodiment of the third element 4. The third element 4 has an essentially analogous construction to the third element 4 from FIG. 6a. In addition, the third element 4 from FIG. 6d has a circumferential neck collar 30, wherein the neck collar 30 serves for an additional form fit during riveting. The neck collar 30 can as shown here be configured as attached slant or through a conical extension of the third element 4.

Figure 7:
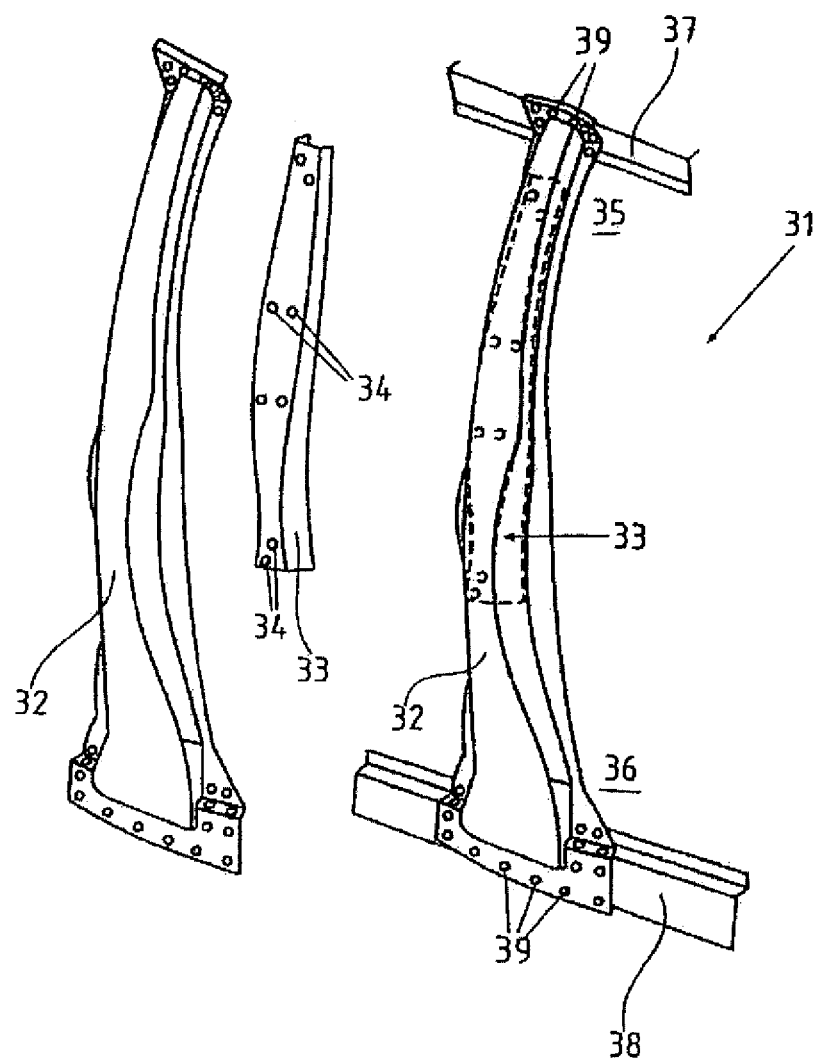

FIG. 7 shows a motor vehicle part 31 produced according to the method according to the invention. The motor vehicle part produced according to the method according to the invention is concretely a first element 32 in the form of a B-column. The first element 32 is composed of an aluminum material and is coupled with a second element 33 in the form of a reinforcement profile made of a steel material. The second element 33 made of a steel material has third elements 34 according to the invention in the form of coupling points made of an aluminum material.

On the right side with regard to the image plane of FIG. 7, the second element 33 made of steel is arranged on the first element 32 made of aluminum from inside and point welded. In the upper and lower section 35, 36 of the first element 32, the latter is coupled to a schematically shown vehicle body 31 composed of an upper cross member 37 and a lower cross member 38. The cross members 37, 38 are made from steel. For this, third elements 39 are arranged in the second element 32 which third elements are made of steel. The third elements 39 are then coupled with the cross members 37, 38 with the method according to the invention.

The eventually resulting important advantage is that the method according to the invention is applicable to already existing manufacturing plants without greater modifications, because point welding and as a consequence point welding plants are already present in the manufacturing of vehicle bodies.

Figure 8:
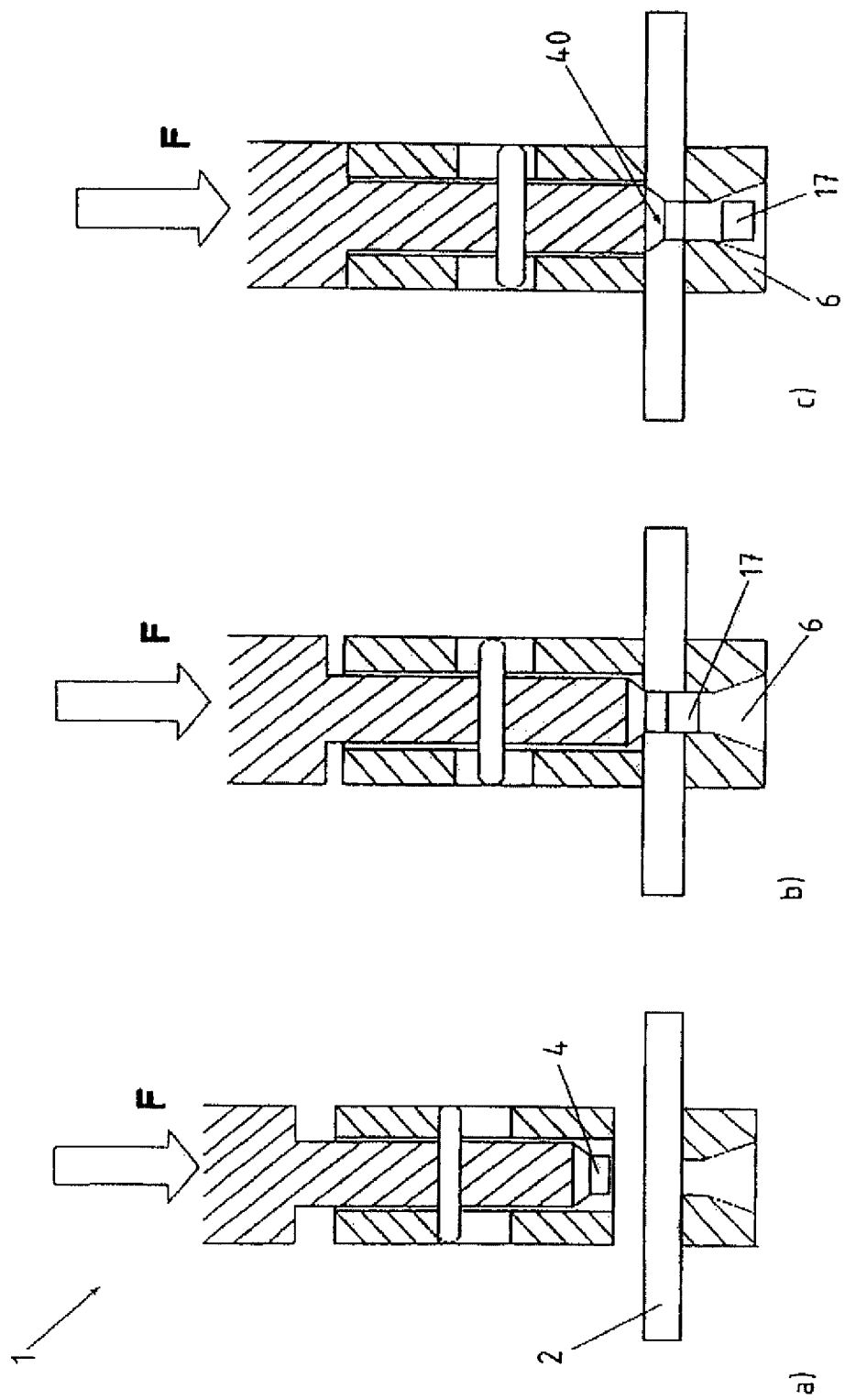

FIG. 8 shows a combination tool 1 according to the invention for performing the method according to the invention. For this, a second element 2 is inserted into the combination tool 1 and a third element 4 is arranged above the second element 2. In a subsequent method step, according to FIG. 8b, the third element 4 is inserted into the second element 2 by way of a punching out process. In the subsequent method step according to FIG. 8, the third element 4 is inserted force fittingly and/or form fittingly into the second element 2. The punched out piece 17 which is generated by the punching out process falls through an exit opening 6 of the combination tool 1. The third element 4 has an upper collar 40 which is shown in more detail in FIG. 9.

Figure 9:
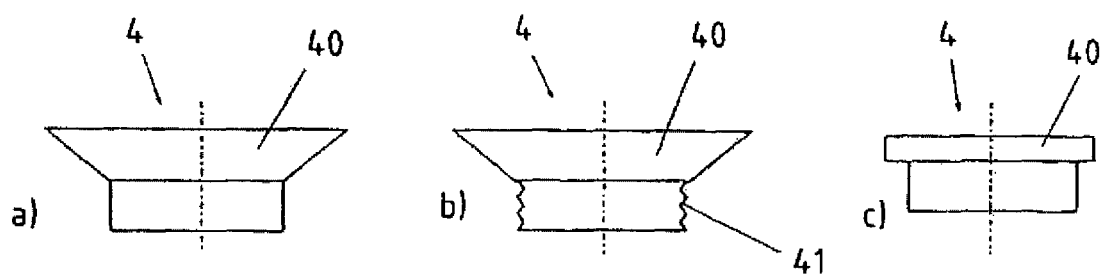

FIG. 9 shows three different embodiments of the third element 4. In FIG. 9a, the third element 4 has an upper collar 40. In FIG. 9b, the third element 4 shows an upper collar 40 and a profiling 41 which is arranged on a side, for increasing the form fitting and/or force fitting connection strength. FIG. 9c shows a further embodiment of collar 40 arranged on top of a third element 4.

Figure 10:
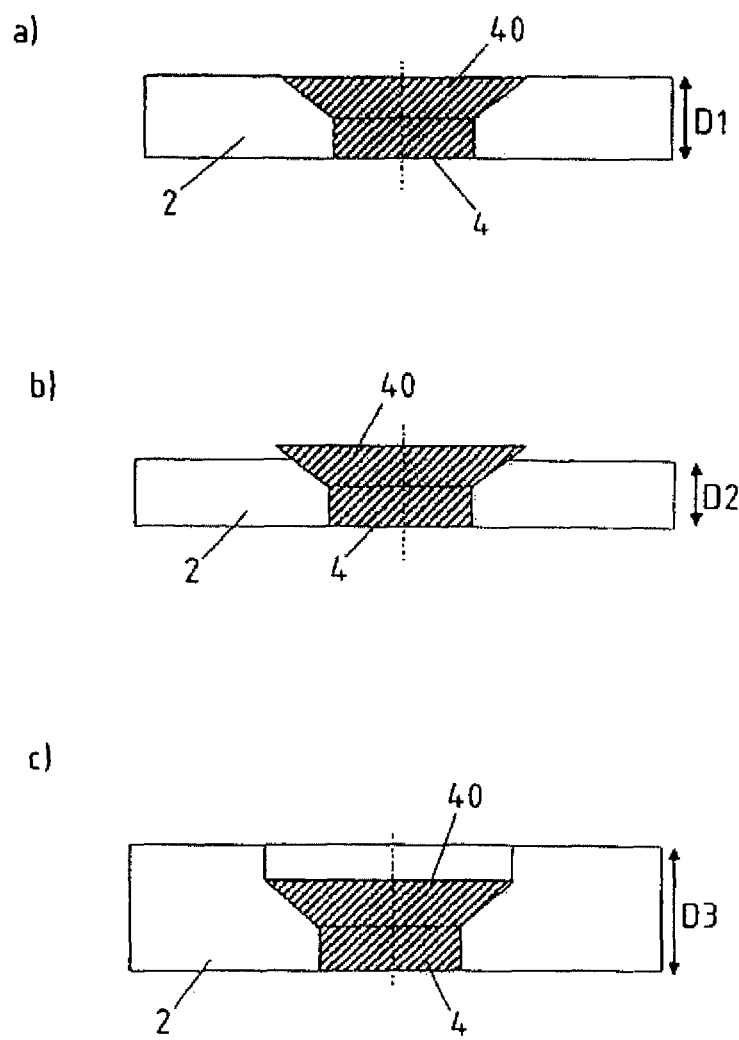

The arrangement of the upper collar 40 it is possible according to FIG. 10 to adjust tolerances of the thicknesses D1 to D3 of the second element 2. In FIG. 10a, a neutral setting position occurs, in FIG. 10b a head protrusion of the third element 4 over the second element 2 and in FIG. 10c a sinking in of the collar 40.

Figure 11:
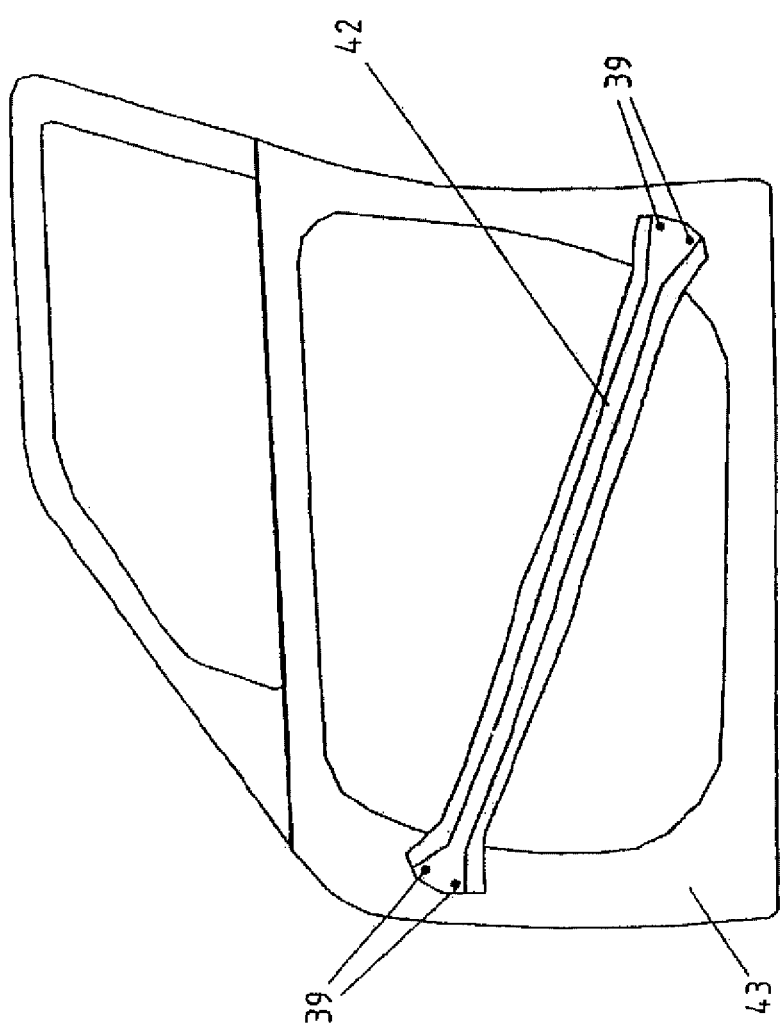

FIG. 11 shows a preferred embodiment in which a door impact beam 42 is inserted into a door frame 43. The coupling between the door impact beam 42 and the frame 43 can be performed with the method according to the invention. This allows coupling different materials for the door impact beam 42, preferably steel, with other types of materials of the frame 43. For the frame, for example, aluminum materials, plastic materials or other lightweight steel materials or composite fiber materials can be used. The third elements 39 in FIG. 11 are again weldable with the material of the frame 43. In the case of an aluminum frame third elements 39 made of an aluminum material which is weldable therewith or other light metal materials are inserted into the door impact beam 42. A coupling can however also occur inversely for example in the form of a composite fiber door or a composite fiber material frame. Here, third elements 39 made of a steel material can be inserted into the door frame 43 itself which are then weldable with the door impact beam 42 made of steel material.

Figure 12:
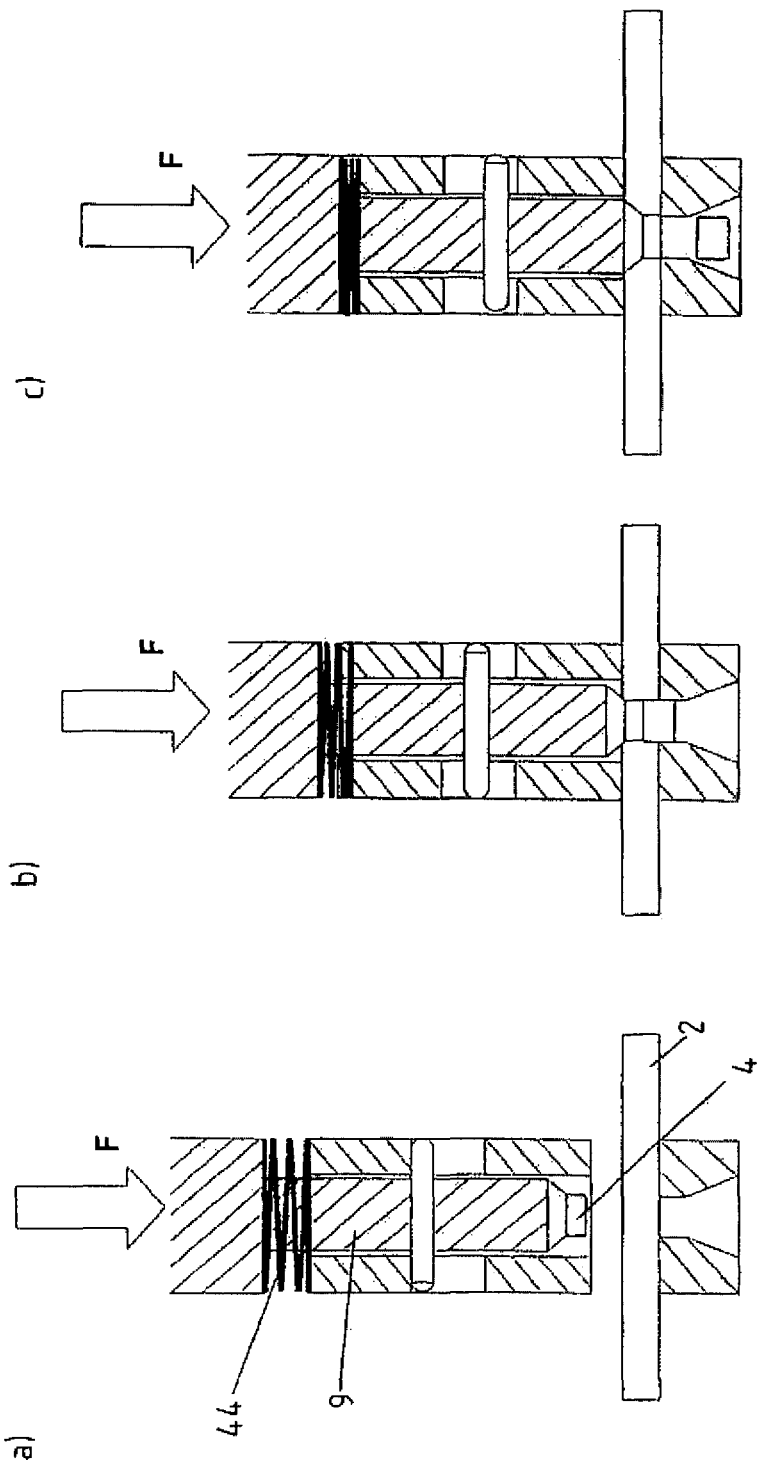

FIG. 12 shows a combination tool 1 according to the invention for inserting a third element 4 into a second element 2. The ram 9 itself has a relief element 44 which compensates an excessive pressure force F. This is shown in sequence in the manufacturing process between FIGS. 12a and 12c. When reaching the pressing in depth the relief element E compensates the excessive pressure force F by compression.

FIG. 13 shows a further embodiment of the present invention. Between the first element 22 and the second element 2 an adhesive layer K is arranged. For this, the third element 4 itself has a protrusion X which essentially corresponds to the thickness DK of the adhesive layer K. The first element 22 and the second element 2 are thus coupled to one another according to the embodiment in FIG. 13 by the adhesive layer K. As additional reinforcement the third elements 4 which are introduced into the second element 2 are provided with the protrusion X. FIG. 13b shows that the adhesive layer K is formed at least in regions between the third element 4 and the first element 22. On the respective ends E of the third elements 34 a direct contact with the first element 22 is established so that an additional material connection is generated by a welding process.

What is claimed is:

1. A method for connecting a first element with a second element, with the first element and the second element being made of different materials, not joinable with a conventional welding process, said method comprising:
   inserting a third element in a direction of a longitudinal axis to form an opening of the second element such that a top surface of the third element extends flush with a top surface of the second element;
   riveting the third element into only the opening of the second element using a punching and rivet tool such that a wall thickness of the third element, as defined in the direction of the longitudinal axis, is identical to a wall thickness of the second element in a region surrounding the opening;
   coupling the third element with only the first element by thermal joining welding process after the riveting step,
   wherein the opening in the second element is punched out with the punching and rivet tool simultaneous to the third element being riveted in the second element with the punching and rivet tool.

2. The method of claim 1, wherein the third element has a punching and rivet collar on a side facing the second element, and wherein the opening in the second element is punched out with the third element.

3. The method of claim 2, further comprising holding the third element above the second element with a holding element prior to the punching out.

4. The method of claim 3, wherein the third element is surrounded by the holding element.

5. The method of claim 1, wherein the punching and rivet tool is constructed as a combination tool, and wherein the combination tool has a ram and a counter holder.

6. The method of claim 5, further comprising moving the counter holder into a first position for punching out, wherein the counter holder has an exit opening for exiting of a piece punched out of the second element by the punching out.

7. The method of claim 5, further comprising moving the counter holder into a second position, wherein in the second position the third element which is inserted into the second element is riveted with the second element by means of the ram and the counter holder.

8. The method of claim 1, wherein the coupling of the first element with the third element is performed with a resistance welding process.

9. The method of claim 1, wherein the coupling of the first element with the third element is performed with a point welding process.

10. The method of claim 1, wherein the first element and the third element are made of a steel alloy and the second element is made of a light metal alloy.

11. A method for producing a motor vehicle component, comprising:
    connecting a first element with a second element, with the first element and the second element being made of different materials, not joinable with a conventional welding process;
    coupling a third element with the second element;

inserting the third element to form an opening of a separate cross member such that a top surface of the third element extends flush with a top surface of the cross member;

riveting the third element into only the cross member such that a wall thickness of the third element is identical to a wall thickness of the cross member in a region surrounding the opening; and coupling the third element with only the first element by thermal joining after the riveting step.

* * * * *